United States Patent
Oh

(10) Patent No.: US 7,986,669 B1
(45) Date of Patent: *Jul. 26, 2011

(54) COMMUNICATION TYPE AND CONGESTION BASED SWITCHING OF AIR INTERFACE PROTOCOLS

(75) Inventor: Dae-Sik Oh, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 84 days.

This patent is subject to a terminal disclaimer.

(21) Appl. No.: 12/372,522

(22) Filed: Feb. 17, 2009

Related U.S. Application Data

(63) Continuation of application No. 11/189,208, filed on Jul. 26, 2005, now Pat. No. 7,519,026.

(51) Int. Cl.
*H04W 4/00* (2009.01)

(52) U.S. Cl. ........ 370/331; 370/328; 370/349; 370/338; 455/552.1; 455/425; 455/128.1; 455/436; 455/404.1; 709/230; 709/249; 709/250

(58) Field of Classification Search .................. 370/331, 370/328, 338, 349; 455/404, 456, 168.1, 455/552.1, 425; 709/230, 249, 250
See application file for complete search history.

(56) References Cited

U.S. PATENT DOCUMENTS

| | | | |
|---|---|---|---|
| 7,509,437 B2 * | 3/2009 | Dowling | 709/249 |
| 2002/0160745 A1 * | 10/2002 | Wang | 455/404 |
| 2004/0120283 A1 * | 6/2004 | Rezaiifar et al. | 370/328 |
| 2005/0032493 A1 * | 2/2005 | Sugiyama et al. | 455/168.1 |

* cited by examiner

*Primary Examiner* — Charles N Appiah
*Assistant Examiner* — Michael T Vu

(57) ABSTRACT

To facilitate vertical handoff, a radio network will identify air interface protocols currently available for use by a wireless device and will then select one of the available air interface protocols based at least in part on the type of communication in which the device is currently engaged. The radio network may further take into consideration the current level of congestion under each available air interface protocol and may select an air interface protocol that has sufficient bandwidth available to support the type of communication in which the device is currently engaged. If the device is not currently operating under the selected air interface protocol, the radio network may then orchestrate a vertical handoff to the selected protocol.

18 Claims, 8 Drawing Sheets

FIG. 6

PREFERRED AIP DATABASE

| COMMUNICATION TYPE | PREFERRED AIP |
|---|---|
| VOICE-OVER IP | IS-856 |
| WIRELESS FILE TRANSFER (DOWNLOADING FILES) | IS-2000 |

FIG. 8

COMMUNICATION TYPE A REQUIRED NETWORK RESOURCES = 15 KB/SEC

| AIP | TOTAL NETWORK RESOURCES (KB/SEC) | EXISTING CONGESTION LEVEL (KB/SEC) | AVAILABLE NETWORK RESOURCES (KB/SEC) |
|---|---|---|---|
| X | 70 | 65 | 5 |
| Y | 30 | 10 | 20 |

COMMUNICATION TYPE AND CONGESTION BASED SWITCHING OF AIR INTERFACE PROTOCOLS

FIELD OF THE INVENTION

The present invention provides a method and system for selecting an air interface protocol under which a multi-mode wireless communication device should operate, based at least in part on the type of communication in which the device is currently engaged. The invention is particularly useful to select an air interface protocol, such as IS-2000 (e.g., 1xRTT) or IS-856 (e.g., EV-DO), which conserves and/or optimizes the use of network resources for a multi-mode wireless communication device.

BACKGROUND

In a typical cellular radio communications system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) or packet data serving node (PDSN) for instance. The switch or gateway may then be coupled with a transport network, such as the PSTN or a packet-switched network (e.g., the Internet).

When a mobile station (such as a cellular telephone, pager, or appropriately equipped portable computer, for instance) is positioned in a cell, the MS communicates via an RF air interface with the BTS antenna of the cell. Consequently, a communication path is established between the mobile station and the transport network, via the air interface, the BTS, the BSC and the switch or gateway.

With the explosive growth in demand for wireless communications, the level of call traffic in most cell sites has increased drastically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, a mobile station in a wireless network will typically be positioned in a given physical sector and will be able to communicate with the transport network via the BTS serving that physical sector.

In some cases, more than one air interface communication protocol might be implemented in a given market area. For instance, as will be described more below, a given market area might provide both legacy CDMA coverage under a standard protocol such as EIA/TIA/IS-2000 Rel. 0, A or other version thereof (hereafter "IS-2000") and also high data rate coverage according to a standard protocol such EIA/TIA/IS-856 Rel. 0, A, or other version thereof (hereafter "IS-856"). In such a system, a mobile station might not only hand off between coverage areas under a common air interface protocol (e.g., between IS-2000 sectors) but may also hand off between the different air interface protocols, such as between IS-2000 and IS-856. Handoff between different air interface protocols (or, more generally, between different access technologies) is known as "vertical" handoff.

To facilitate vertical handoff, a mobile station operating under a given air interface protocol might be arranged to periodically check for availability of service under another air interface protocol. By way of example, a mobile station operating under IS-856 might periodically check for availability of IS-2000 service. Further, when the signal strength of the available IS-2000 service is sufficiently higher than the signal strength of the existing IS-856 service, the mobile station may hand off from the IS-856 system to the IS-2000 system, typically with approval from the BSC.

SUMMARY

As a general matter, the invention involves identifying air interface protocols currently available to a wireless device, and then selecting one of the available air interface protocols based at least in part on the type of communication in which the device is currently engaged. More particularly, an exemplary embodiment of the invention may involve the functions of (i) identifying one or more air interface protocols under which wireless service is available for the device, (ii) determining a type of communication in which the device is currently engaged, and (iii) based at least in part on the type of communication, selecting one of the air interface protocols available for the device as an air interface protocol under which the device should operate. If the device is already operating under the selected air interface protocol, then a vertical handoff will not be performed. On the other hand, if the device is not currently operating under the selected air interface protocol, then the invention may further involve invoking a vertical handoff to the selected air interface protocol.

To determine the air interface protocols under which service is available, the invention may involve determining the air interface protocols provided at the geographic location of the device. The invention may further involve determining the air interface protocols the device supports. In addition an air interface protocol that is both provided for the device at its geographic location and supported by the device, may be selected as the air interface protocol under which the device should operate.

The selection of an air interface protocol under which the device should operate may be further based on the available network resources at the location of the device. Specifically, a level of network resources required for the type of communication in which the device is engaged may be retrieved from a database. Next, the total network resources under each available air interface protocol may be retrieved from a database. Further, the existing levels of congestion for each of the available air interface protocols may be determined. By subtracting the existing level of congestion from the total network resources, the available network resources under each available air interface protocol may be calculated. An air interface protocol where the available network resources are greater than or equal to the required network resources for the type of communication in which the device is engaged, may then be selected.

The present invention offers significant benefits in the quality of service provided to users of multi-mode wireless communication devices by communications providers (e.g., wireless service carriers). With the present invention, a provider can intelligently select an air interface protocol for a device based on the bandwidth requirements for the type of communication in which the device is engaged, thereby conserving network resources. As an example, a user who by default is using IS-856, may be instructed to operate under IS-2000 because the user is engaged in a communication that does not require much bandwidth.

Further, by considering congestion levels, a radio access network can continually maximize the bandwidth provided to each device in a coverage area, thereby optimizing network resources. For example, during off peak hours, congestion may be low. Therefore users who do not require much bandwidth, such as those engaged in simple web browsing, may nonetheless be given an air interface protocol providing more bandwidth, because the system resources are available. On the other hand, in times where the network is congested, systems resources can be preserved for communication types that require more bandwidth.

These as well as other aspects and advantages will become apparent to those of ordinary skill in the art by reading the following detailed description, with appropriate reference to the accompanying drawings.

BRIEF DESCRIPTION OF THE DRAWINGS

FIG. 6 is a table showing a possible database in an exemplary embodiment.

FIG. 8 is another table showing a possible database in an exemplary embodiment.

DETAILED DESCRIPTION

The present invention will be described by way of example with reference to the IS-2000 and IS-856 air interface protocols. It should be understood, however, that the invention can extend to apply in other arrangements as well.

1. CELLULAR WIRELESS PACKET DATA COMMUNICATIONS

Figure 1:
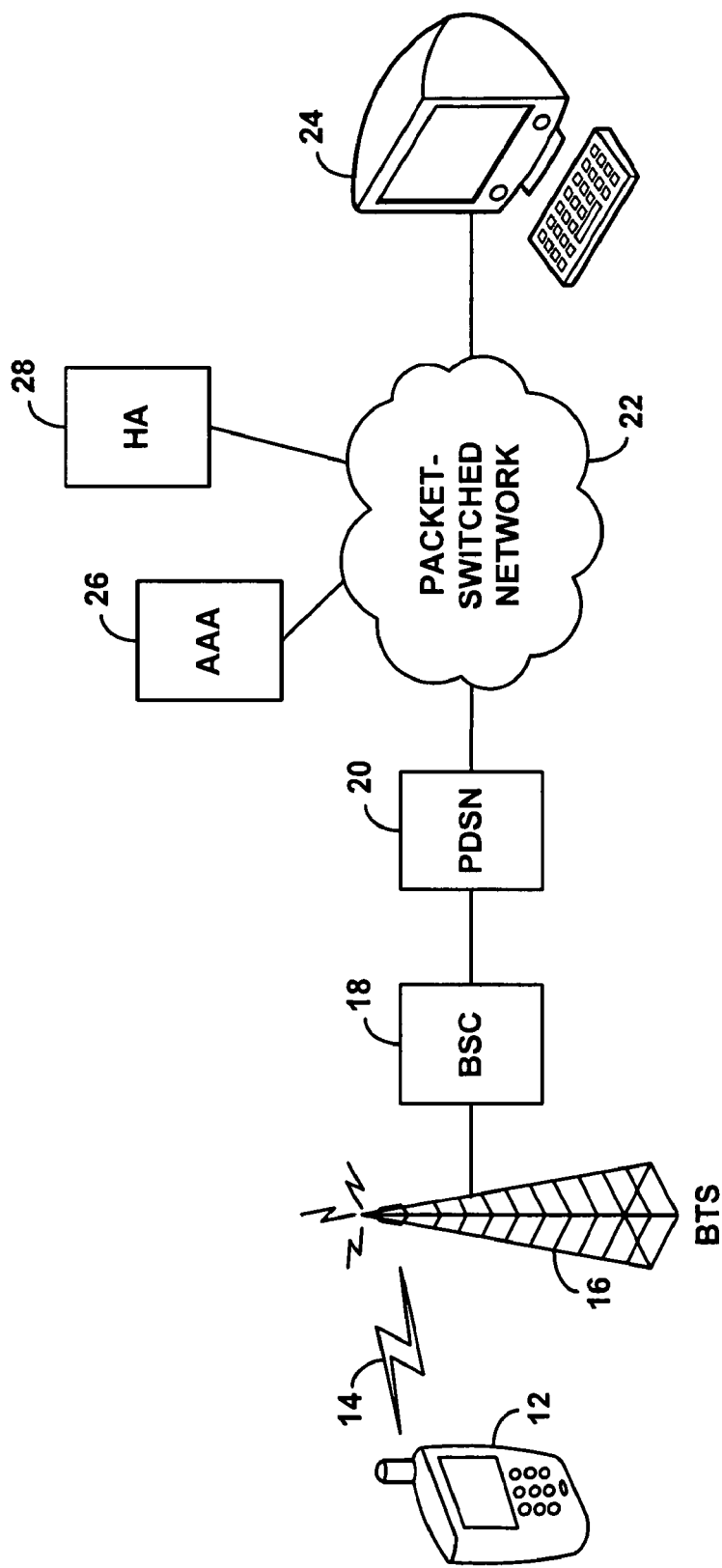
FIG. 1 is a simplified block diagram of a wireless communication system in which an exemplary embodiment of the invention can be employed.

FIG. 1 depicts an example cellular wireless communication system adapted to provide wireless packet data communication service for a wireless communication device 12. Wireless communication device 12 communicates over an air interface 14 with a BTS 16, which is then coupled or integrated with a BSC 18. BSC 18 is then coupled with a PDSN 20, which provides connectivity with a packet-switched network 22 such as the Internet and/or a wireless carrier's private core packet-network. Sitting as nodes on network 22 are, by way of example, a remote computer 24, an authentication, authorization, and accounting (AAA) server 26, and a mobile-IP home agent (HA) 28.

With this arrangement, after being authenticated by AAA server 26, HA 28 may assign an IP address for use by wireless communication device 12, and wireless communication device 12 may then engage in packet-data communications with entities such as remote computer 24, via a communication path comprising air interface 14, BTS 16, BSC 18, PDSN 20, and network 22. To facilitate communications via air interface 14, an air interface protocol may be used.

Figure 2:
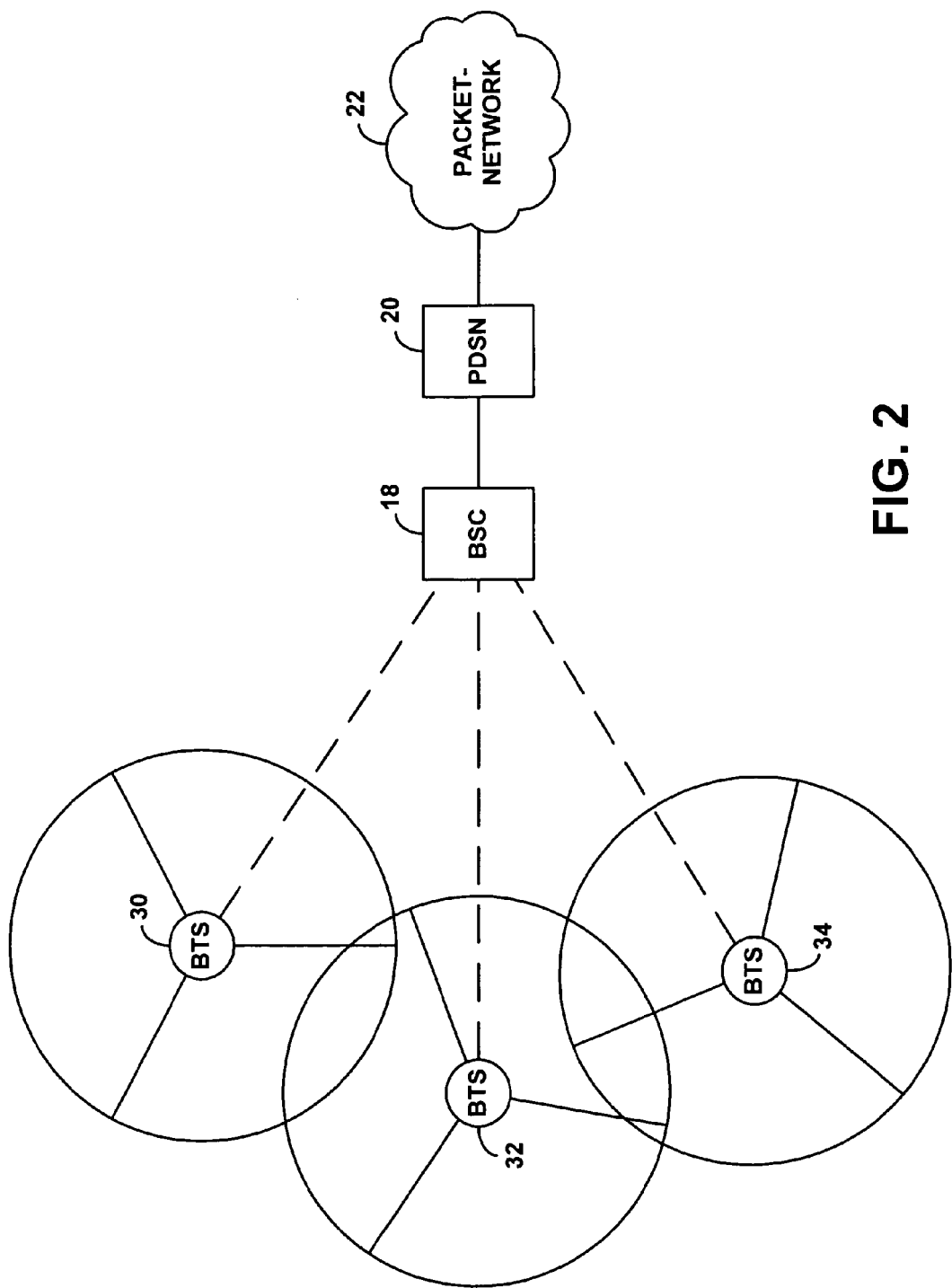
FIG. 2 is another simplified block diagram of a wireless communication system in which the exemplary embodiment can be employed.

In practice, BSC 18 may serve multiple BTSs. Each BTS may then radiate to define a given cell and a plurality of cell sectors. FIG. 2 illustrates this arrangement. As shown in FIG. 2, BSC 18 is coupled with three BTSs 30, 32, 34. Each BTS is shown at the core of a respective circle representing a cell, and each cell is divided into three pie-pieces representing sectors. With this arrangement, a wireless communication device can operate in any of the sectors and can communicate on packet network 22 via its serving BTS, and via BSC 18 and PDSN 20.

Throughout this description, the term "base station" will refer to a radio access network element such as a BTS, a BSC, or combination BTS/BSC, for instance. The term "air interface protocol" (AIP) may be used to refer to any means used by a wireless communication device to communicate with a base station, such as the IS-2000 standard or the IS-856 standard. The term "radio access network" (RAN) may be used to describe any communication network having at least one wireless communication device capable of communicating with at least one base station under one or more air interface protocols.

2. LEGACY CDMA COMMUNICATIONS

In a conventional or "legacy" Code Division Multiple Access ("CDMA") wireless network compliant with the well known IS-2000 standard, each cell employs one or more carrier frequencies, typically 1.25 MHz each, and each sector is distinguished from adjacent sectors by a pseudo-random number offset ("PN offset"). Further, each sector can concurrently communicate on multiple different channels, distinguished by "Walsh codes". When a wireless communication device operates in a given sector, communications between the wireless communication device and the BTS of the sector are carried on a given frequency and are encoded by the sector's PN offset and a given Walsh code.

Air interface communications are divided into forward link communications, which are those passing from the base station to the wireless communication device, and reverse link communications, which are those passing from the wireless communication device to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With this arrangement, a wireless communication device can be arranged to engage in packet-data communications. To do so, the wireless communication device first sends a packet-data origination request over the access channel and via the BTS 16 and BSC 18 to an MSC (not shown). The MSC then signals back to the BSC directing the BSC to assign an air interface traffic channel for use by the wireless communication device, and the BSC signals to the PDSN 20. The PDSN 20 and wireless communication device 12 then negotiate to establish a data link layer connection, such as a point to point protocol (PPP) session. Further, the PDSN 20 sends a foreign agent challenge message to the wireless communication device, and the wireless communication device responds with a mobile-IP registration request (MIP RRQ), which the PDSN forwards to HA 18. The HA then assigns an IP address for the wireless communication device to use, and the PDSN passes that IP address via the BSC to the wireless communication device.

Once the wireless communication device has a radio link (an assigned traffic channel), a data link, and an IP address, the wireless communication device is considered to be in an "active" mode. To conserve air interface resources, however, an IS-2000 system is typically arranged to release the wireless communication device's assigned traffic channel after a certain amount of time during which no data traffic passes to or from the wireless communication device through the PDSN. Upon release of the wireless communication device's radio link, the wireless communication device is considered to be in a "dormant" mode, in which it lacks a radio link but still has a data link and an IP address.

While in the dormant mode, if the wireless communication device seeks to transmit packet-data from its IP address, the wireless communication device would re-acquire a radio link by sending a new origination request message to the BSC. Similarly, if the PDSN receives packet-data destined for the IP address of a dormant wireless communication device, the PDSN would notify the BSC, the BSC would page the wireless communication device to cause the wireless communication device to then re-acquire a radio link, and the PDSN would then pass the data along to the wireless communication device.

3. HIGH RATE PACKET-DATA COMMUNICATIONS

Under IS-2000, the highest rate of packet-data communications theoretically available on a fundamental traffic channel of the forward link is 9.6 kbps. In order to provide higher rate packet-data service to support higher bandwidth applications, the industry has introduced a new "high rate packet data (HRPD) system," which is defined by industry standard IS-856.

IS-856 leverages the asymmetric characteristics of most IP traffic, in which the forward link typically carries a heavier load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel used to indicate the supportable data rate and best serving sector for the forward link. The end result is that a wireless communication device operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. As in IS-2000, each sector in IS-856 is defined by a PN offset, and the pilot channel carries an indication of the sector's PN offset.

To acquire packet data connectivity under IS-856, after a wireless communication device first detects an IS-856 carrier, the wireless communication device sends to its BSC (or "RNC") 18 a UATI (Universal Access Terminal Identifier) request, and receives in response an International Wireless communication device Identifier (IMSI), which the wireless communication device can then use to identify itself in subsequent communications with the BSC. The wireless communication device then sends a connection-request to the BSC 18, and the BSC responsively invokes a process to authenticate the wireless communication device and to have the wireless communication device acquire a data link.

In particular, the BSC 18 sends an access request to an Access Network AAA (ANAAA) server (which may be different than the AAA server 26 shown in FIG. 1), and the ANAAA server authenticates the wireless communication device. The BSC 18 then assigns radio resources for the data session, by directing the wireless communication device to operate on a particular time slot traffic channel on the forward link and a particular Walsh coded traffic channel on the reverse link. Further, the BSC signals to the PDSN 20, and the PDSN and wireless communication device then negotiate to establish a PPP data link. In addition, as in the IS-2000 process, the wireless communication device then sends an MIP RRQ to the PDSN, which the PDSN forwards to the HA 18, and the HA assigns a mobile-IP address for the wireless communication device to use.

As in IS-2000, once the wireless communication device has acquired an IS-856 radio link, a data link, and an IP address, the wireless communication device is considered to be in an active mode. In the active mode, the wireless communication device is given full use of the sector power in its assigned time slot, i.e., each time its time slot occurs, which facilitates higher rate data communication. Further, as in IS-2000, if the wireless communication device does not send or receive data for a defined period of time, the wireless communication device enters a dormant mode. In the dormant mode, an IS-856 system maintains the logical state of the wireless communication device's session (e.g., IP address, PPP state, and radio link session information), while releasing the wireless communication device's radio link resources (e.g., the time slot that had been assigned for use by the wireless communication device). With the maintained session state, the wireless communication device can quickly re-acquire a radio link so as to send or receive packet data, thereby giving the appearance that the wireless communication device is "always on."

4. MULTI-MODE OPERATION OF WIRELESS COMMUNICATION DEVICES

Given the proliferation of legacy IS-2000 networks, IS-856 was designed to be backwards compatible and to facilitate "multi-mode" operation. Generally, a "multi-mode wireless communication device" is any wireless communication device capable of communicating on a wireless network using one or more air interface protocols. In the preferred embodiment, a multi-mode device may operate under both the IS-2000 and IS-856 air interface protocols. In addition, the device may be capable one or more types of communication, such as sending and receiving voice and short message service (SMS) messages, dedicated channel data services on IS-2000 networks, and high-speed packet data service on IS-856 networks. Further, the device may operate under other air interface protocols and may be capable of other communication types.

In a multi-mode network, IS-2000 and IS-856 coverage are provided on different carrier frequencies, each of which is 1.25 MHz in bandwidth for consistency with legacy operation. Further, most IS-856 systems are provided as overlays on existing IS-2000 systems, such that a given BSC provides either IS-2000 coverage or both IS-2000 and IS-856 coverage. For an IS-2000 sector, the BSC may have just an IS-2000 circuit card. For a multi-mode IS-2000/IS-856 sector, on the other hand, the BSC may have both an IS-2000 circuit card to facilitate IS-2000 operation and an IS-856 circuit card to facilitate IS-856 operation. A typical multi-mode device will be programmed to use an IS-856 data connection when faced with the choice between IS-856 and IS-2000, i.e., when in a multi-mode sector.

However, under existing industry standards, a device that is in active IS-2000 mode will not hand off to IS-856, even if IS-856 is available. This occurs because a device in an active 2000 mode does not perform off-frequency searches for IS-856 coverage. (This is in contrast to what happens when the multi-mode device is in a dormant/idle IS-2000 mode.) Consequently, when a device is in an active IS-2000 mode, the device will continue to operate under IS-2000, even if IS-856 is available to the device. As a result, under existing industry standards, the device does not benefit from the higher data rate provided by IS-856.

5. SELECTING A TARGET AIR INTERFACE PROTOCOL

Figure 3:
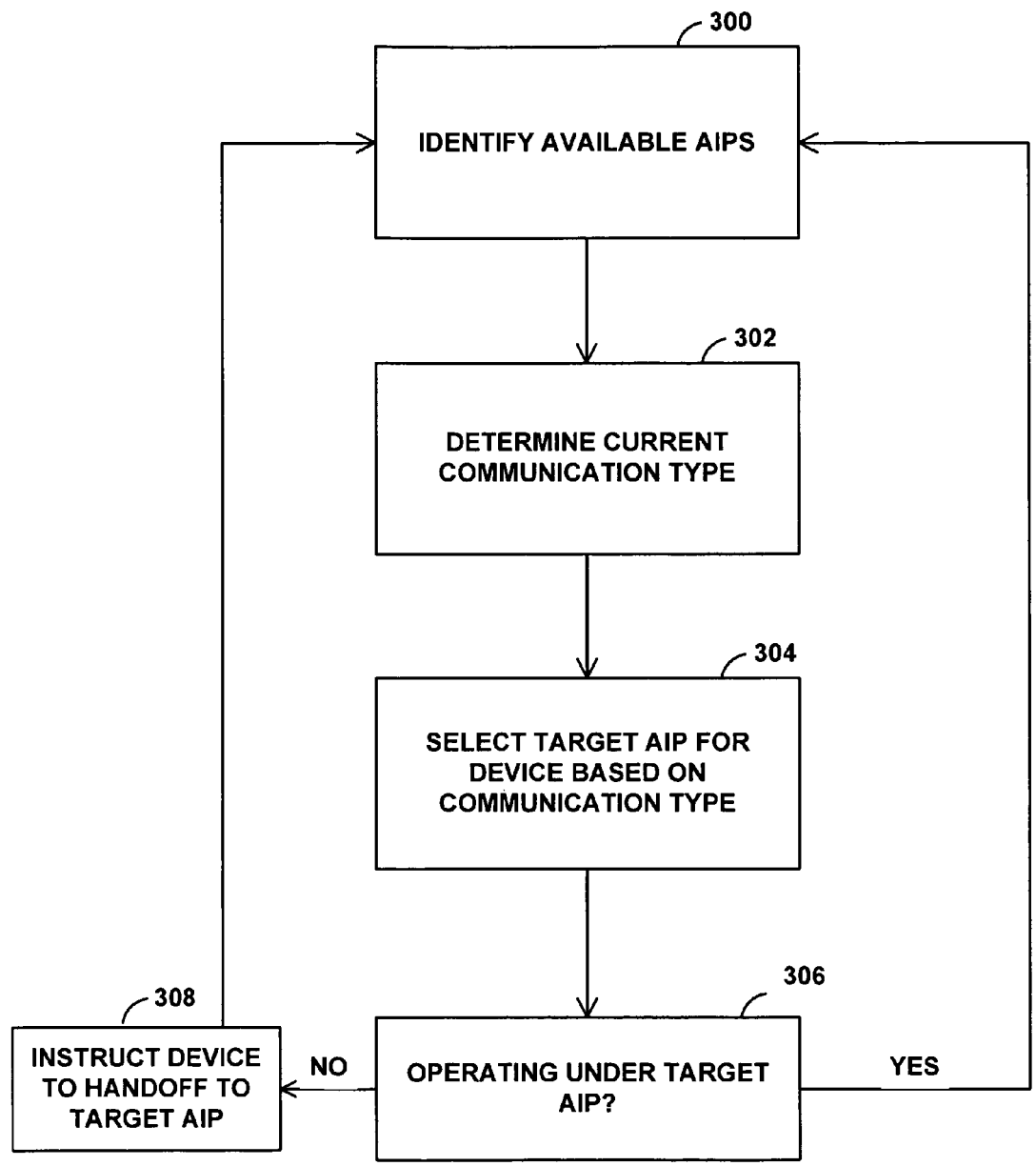
FIG. 3 is a flow chart depicting functions that can be carried out in accordance with the exemplary embodiment.

FIG. 3 is a generalized flow chart depicting an exemplary embodiment of the present invention. First, as shown in step 300 and described in detail in Section 5(A) below, one or more air interface protocols ("AIPs") available for use by a wireless communication device may be identified. The identification of the AIPs available for use (the "available AIPs") may involve determining the AIPs currently provided by a network (the "provided AIPs"), the AIPs supported by the device (the "supported AIPs"), and/or other factors. Second, as shown in step 302 and described in detail in Section 5(B) below, the type of communication in which the device is currently engaged may be determined. Third, as shown in step 304 and described in detail in Section 5(C) below, the AIP under which the device should operate (the "target AIP") may be selected based at least in part on the type of communication in which the device is engaged. Further, if the device is not currently operating under the target AIP, the device may be instructed to perform a vertical handoff, causing the device to switch to the target AIP as shown in step 306. If the device is already operating under the target AIP, then no handoff would be performed.

Figure 4:
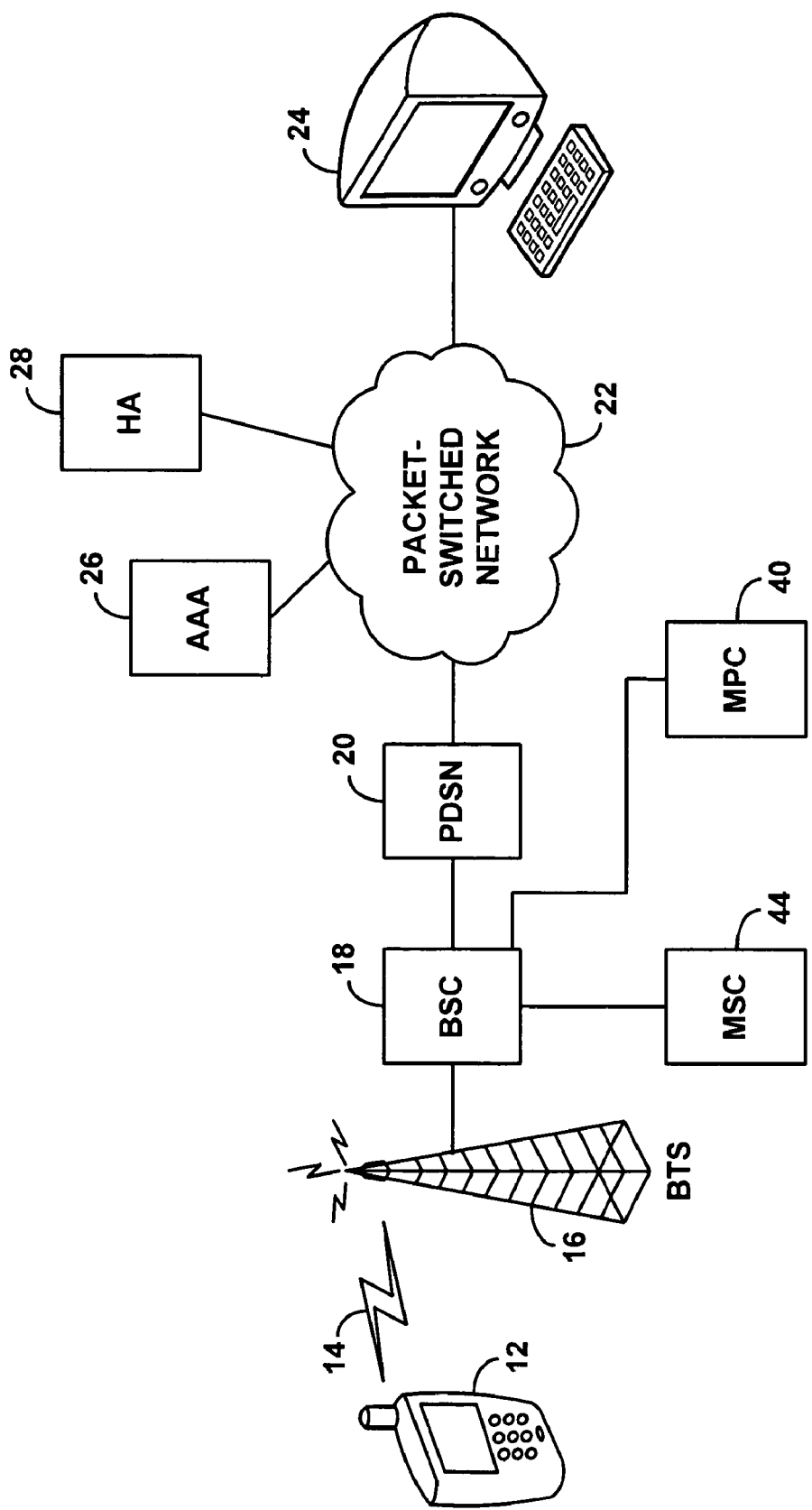
FIG. 4 is another simplified block diagram of a wireless communication system in which the exemplary embodiment can be employed.

In a preferred embodiment, the invention will be implemented primarily in a radio access network (RAN), such as the RAN shown in FIG. 4. Specifically the invention may be carried out by a base station controller ("BSC") 18. The BSC 18 may include a packet control function ("PCF"), software creating an interface between the BSC 18 and the PDSN 20. In addition, the BSC 18 may contain program logic executable by a processor to carry out the present invention.

In the exemplary embodiment, the BSC will be provided with or have access to a data storage center (DSC) containing the data necessary to carry out the invention. The present invention will be described by way of example with respect to the preferred embodiment. It should be understood, however, that the invention can extend to apply in other arrangements as well.

A. Determining a Set of Available Air Interface Protocols

To select a target AIP for a device, the BSC 18 may first identify a set of available AIPs from which the target AIP may be selected. The available AIPs may include IS-2000, IS-856, as well as other AIPs. To identify the available AIPs, the BSC 18 may first determine the geographic location of the device. The geographic location may be an area in a wireless communication network, such as cell, or a sector within a cell. After determining the geographic location of the device, the BSC may determine the AIPs under which service is provided at the geographic location.

The BSC may determine the geographic location of a wireless communication device by regularly monitoring the device, such as by periodically querying a mobile positioning center (MPC) 40 or periodically querying the device itself (e.g., using IS-801 position-determination messaging). The MPC 40 and/or the device may provide the BSC 18 with one or more satellite-based positioning measurements, such as GPS readings, which will indicate or facilitate a determination of the device's current geographic location. In an alternative embodiment, the MPC 40 can track the location of the device, and the determined location of the device can be a projected location based on its trajectory and speed. The projected location may be determined by program logic contained in the BSC 18 or provided to the BSC by another source, such as MPC 40, for instance.

The DSC 42 will preferably include and provide the BSC 18 access to a location-protocol mapping database that associates geographic locations with one or more air interface protocols provided by the RAN at each location. Given the location of the device, the BSC 18 can then conveniently query the DSC 42 in order to identify the AIPs provided by the RAN at the device's location. The set of available AIPs from which the target AIP is selected may consist of the AIPs which are provided at the location of the device. Alternatively, the set available AIPs may be created by considering the provided AIPs and/or other factors.

Figure 5:
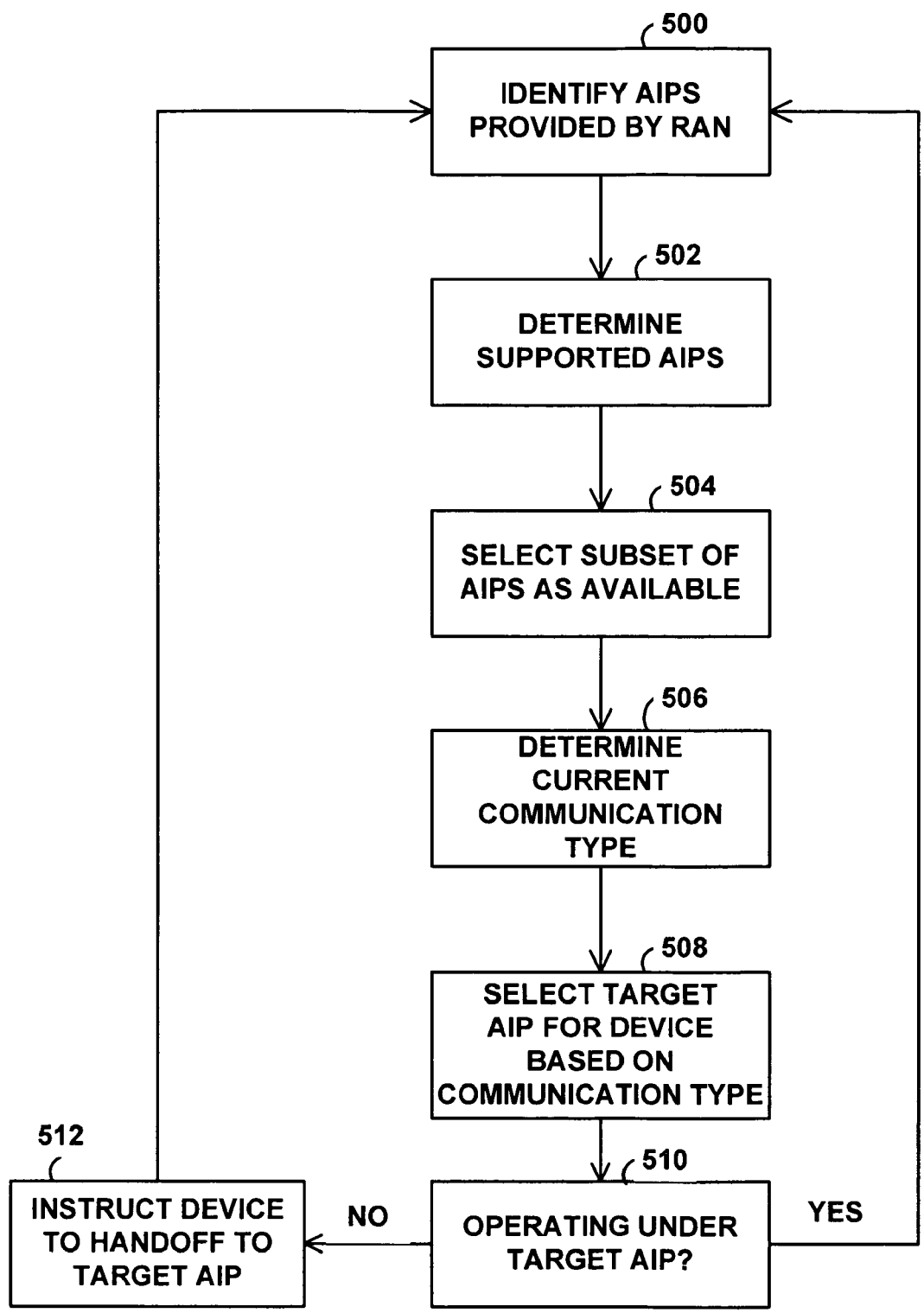
FIG. 5 is another flow chart depicting functions that can be carried out in accordance with the exemplary embodiment.

FIG. 5 shows how the BSC 18 may create a set of available AIPs from which the target AIP is selected using the AIPs supported by the device in addition to the AIPs provided by the RAN. At step 500, the RAN identifies the AIPs provided by the RAN, as discussed above. Then, as shown in step 502, the RAN determines the AIPs that the device itself supports. To identify the supported AIPs, the BSC 18 may query a device-capabilities database contained in the DSC 42. The device-capabilities database may associate each device with the AIPs supported by the device. The device-capabilities database may be populated by network providers. The BSC may then determine that the available AIPs are the AIPs that are both provided at the location of the device and supported by the device, as shown in step 504. In steps 506 to 510 and as previously described, the BSC determines the type of communication in which the device is engaged, selects a target AIP based on the type of communication, and if necessary, instructs the device to perform a vertical handoff.

Consideration of the supported AIPs allows older devices, that may not be compatible with newer AIPs, to take advantage of the present invention to the extent possible. For example, a device may not be capable of communicating under IS-856, a relatively new AIP. Since the device cannot communicate under IS-856, IS-856 will not be selected as an AIP available to the device, and therefore will not be erroneously selected as the target AIP for the device.

B. Determining the Communication Type

After determining which AIPs are available to the device, the BSC may determine the type of communication in which the wireless communication device is currently engaged. The BSC can do this in various ways. By way of example, the BSC can determine what network address (e.g., IP address) the device is communicating with (or has most recently communicated with) and can correlate that network address with a particular type of communication. One network address, for instance, might be the address of a conference server (e.g., a push-to-talk server), which could indicate that the device is engaging in real-time media communication, while another network address might be the address of a web server, which could indicate that the device is engaging in simple web browsing.

In an exemplary embodiment, the BSC 18 may have access to the source and destination IP addresses in packets being transmitted to and from the device. The PCF in BSC 18 can determine the network address by reference to that information. The DSC 42 may include an address-application mapping database having data that correlates network addresses with particular applications. The BSC 18 can query the DSC 42 with the network address to determine the type of communication in which the device is currently engaged, based on the network address with which the device is communicating.

As another example, the BSC may determine the type of communication in which the device is engaged using service option codes. A service option code is typically contained in origination messages sent to the BSC 18 by a device whenever the device initiates a communication session. A different service option code can be associated with each communication type. In particular, each type of packet data service (e.g. wireless web browsing, voice-over-IP, and others) can be associated with a different service option code. Therefore, the BSC can identify the type of communication in which the device is engaged by referencing the service option code included in the most recent origination message sent by the device. In this example, the program logic for processing origination messages is contained in a BSC. In some embodiments, this program logic may be contained in a separate mobile switching center (MSC) in communication with the BSC, or in another location in communication with the BSC. The BSC can then receive the information necessary to determine the type of communication from the MSC or the other location.

C. Selecting a Target Air Interface Protocol Based on Communication Type

Based at least in part on the type of communication in which the device is engaged, the BSC 18 may select a target AIP under which the wireless communication device should operate. Preferably, the DSC will include a preferred air interface protocol database associating a preferred AIP with each communication type. The BSC 18 may query the DSC to determine the preferred AIP for the type of communication in which the device is engaged. The preferred AIP may then be selected as the target AIP by the BSC.

As an example, the BSC may determine, using a device's IP address, that the user of the device is engaged in a real time media communication session, such as a voice-over-IP session. FIG. 6 shows an example of a preferred air interface protocol database that may be contained in the DSC. Due to the high bandwidth required for voice-over-IP, IS-856 may be the preferred AIP for voice-over-IP. Having determined the device is engaged in voice-over-IP communication the BSC may thus query the DSC to determine that IS-856 is the preferred AIP for voice-over-IP. As a result, the BSC may select IS-856 as the target AIP for the device. Alternatively, for a device that is downloading a small file, a communication type that generally does not require high bandwidth, IS-2000 may be set as the preferred AIP. This device may be instructed to operate under IS-2000, even if IS-856 is also available, in order to conserve system resources.

In an alternative embodiment, the DSC may include and provide the BSC access to a preferred air interface protocol database associating a set of one or more preferred AIPs with each communication type. When a set of preferred AIPs is associated with each communication type, each AIP in the set may be associated with a ranking, indicating an order of preference. Having determined the type of communication in which the device is engaged, the BSC 18 may query the DSC to determine the one or more preferred AIPS for the type of communication in which the device is engaged. The AIP with the highest ranking may be selected as the target AIP. Further, other factors (e.g. the availability of network resources, as discussed in Section 5(D)) may indicate that the highest ranked AIP should not be selected as the target AIP. In this situation, one of the lower ranked AIPs may be selected as the target AIP.

Once the BSC 18 selects a target AIP under which the device should operate, the BSC 18 may determine whether the device is already operating under the selected AIP. If the device is not already operating under the target AIP, the BSC 18 may direct the device to perform a vertical handoff to the target AIP. To do so, the BSC 18 may send a "global service redirect" message (GSRM) to the device. Preferably, such a message would be defined universally for all available AIPs or the message would be sent via some air interface channel that is common to all of the AIPs. After receiving the GSRM, the device would perform a vertical handoff, switching from the current AIP to the target AIP. To facilitate a vertical handoff, the wireless communication device may include a processor, data storage, and machine language instructions stored in the data storage and executable by the processor to carry out functions such as receiving an GSRM from the BSC, and acquiring IS-856 packet data connectivity as the result of such a GSRM, and/or other functions.

D. Selecting a Target Air Interface Protocol Based on Available Network Resources A given type of communication may require a minimum level of network resources (the "required network resources") to be successful. The DSC may include and provide the BSC access to a required network resource database associating communication types with the required network resources for each communication type. If the network resources currently available to a device are insufficient for the type of communication in which the device is engaged, the communication may fail or errors in the communication (e.g. dropped packets) may occur. To increase the probability of a successful communication, the BSC may calculate the network resources currently available (the "available network resources") for each available AIP. The BSC may then compare the available network resources for each available AIP to the required network resources for the communication type of the device. Performing this comparison can prevent the BSC from selecting an AIP having insufficient network resources as the target AIP, thereby increasing the probability of successful communication.

To calculate the available network resources under a given AIP, the BSC may subtract the network resources that are currently in use under the AIP (the "existing congestion level") from the total network resources provided under a given AIP (the "total network resources"), as shown in the following equation:

$$\text{Available Network Resources} = \text{Total Network Resources} - \text{Existing Congestion Level}$$

The DSC may include or provide the BSC access to a total network resources database associating each AIP with the total network resources available under each AIP. If the BSC determines that the available network resources for an AIP are less than the required network resources for the type of communication in which the device is engaged, the BSC will not select the AIP as the target AIP.

Figure 7:
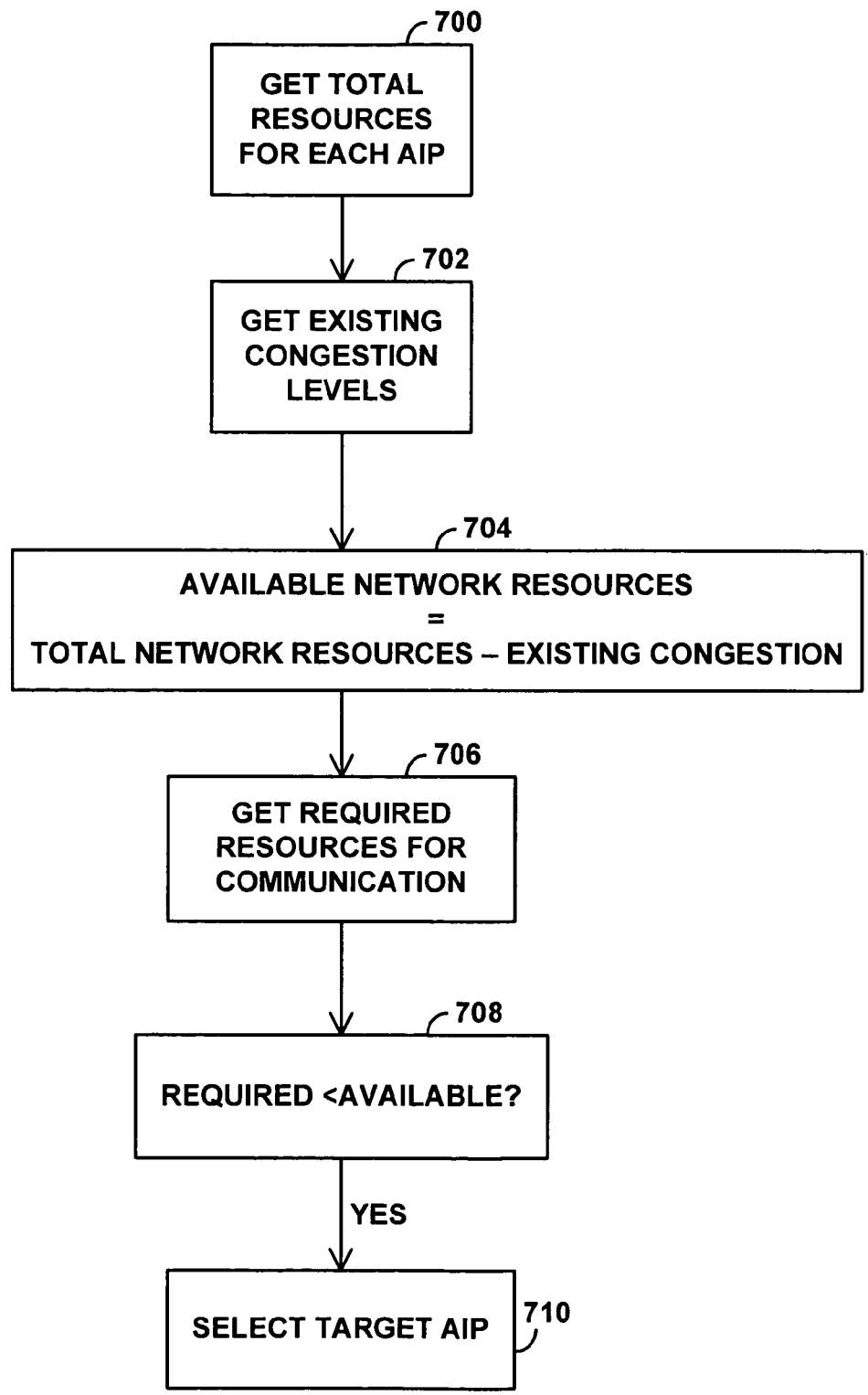
FIG. 7 is another flow chart depicting functions that can be carried out in accordance with the exemplary embodiment.

FIG. 7 shows an embodiment of the present invention that bases the selection of a target AIP, at least in part, on the network resources available to the device. The BSC 18 may first query the DSC to retrieve the total network resources for one or more of a set of available AIPs, as shown in step 700.

The set of available AIPs may have been determined using the AIPs provided by the RAN and/or the AIPs supported by the device, as described in Section 5(A), or in some other manner. Next, the BSC 18 may retrieve the existing congestion levels for each of the available AIPs, as shown in step 702, which the BSC likely tracks as a matter of course. Then, in step 704, the BSC 18 may calculate the available network resources equal to total network resources minus the existing congestion level, for the set of available AIPs.

Having determined the available network resources for each AIP, the BSC may query the DSC to retrieve the required network resources for the type of communication in which the device is engaged, as shown in step 706. The BSC may then select a target AIP having available network resources less than the required network resources for the communication type, as shown in steps 708 and 710. If more than one of the available air interface protocols has available network resources greater than the required network resources, the BSC may select an AIP randomly or by taking one or more other factors into consideration.

Network resources may be characterized in various ways, one example of which is bandwidth (e.g. kilobits per second) that is available for use by the device. The required network resources for a communication type may thus be the available bandwidth that results in a high probability of successful communication. The probability of success can be set by engineering design choice or by other methods. Likewise, the total network resources available under a given AIP may be the total bandwidth provided under the AIP. The existing congestion level may be the bandwidth currently in use (e.g. the current level of throughput currently flowing to and or from the wireless coverage area that encompasses the device's location.) under the AIP. Thus, the available network resources for each AIP may be equal to the total bandwidth provided under the AIP minus the current throughput under the AIP. The BSC likely tracks the level of throughput, and thus the existing congestion levels, as a matter of course. Alternatively, the BSC may calculate the level of throughput as needed.

As an example, a device may be engaged in a communication of type A, communication type A having a preferred AIP X. FIG. 8 shows the available network resources, total network resources and existing congestion levels under AIP X and AIP Y in this example. A situation may exist where too many users are operating under AIP X at the location of the device. If the bandwidth required for communication type A (15 kb/sec) is greater than the bandwidth available under AIP X (5 kb/sec), a communication of type A may fail under AIP X. By considering network resources, the BSC may prevent this failure. Specifically, the BSC may determine that the available bandwidth under AIP X (5 kb/sec) is below the required bandwidth for communication type A (15 kb/sec) and instruct the device to operate under an alternative AIP, such as AIP Y, for which available bandwidth (20 kb/sec) is greater than the required bandwidth for communication type A (15 kb/sec).

In an alternative embodiment, the BSC may narrow the set of available AIPs using the available network resources, rather than select a single target AIP based on the available network resources. The BSC may create a set of available AIPs consisting of AIPs that are provided by the RAN and/or supported by the device, and also have sufficient available network resources. The BSC may then select a target AIP from this narrowed set of available AIPs by considering factors other than network resources. For example, after determining what AIPs have sufficient available network resources, the BSC may query the DSC in order to determine the ranking of the available AIPs, and base the selection of the target AIP on the ranking.

The BSC may also contain more sophisticated program logic allowing it to dynamically assign AIPs based on both the type of communication and available network resources. As an example, a device engaged in a communication type for which IS-2000 is sufficient, may be instructed to operate under IS-856 in order to improve performance when IS-856 congestion is low. This result may be accomplished by making IS-856 the preferred AIP when IS-856 congestion is below a specified level, and IS-2000 the preferred AIP when IS-856 congestion is above the specified level. Thus, when congestion under IS-856 increases, the same device may be instructed to operate under IS-2000, preserving system resources for those devices engaged in communication types for which a higher bandwidth AIP, such as IS-856, is necessary. Here, by using network resource information in conjunction with communication type to dynamically select a target AIP, the BSC preserves network resources and optimizes the bandwidth provided to each device.

It should be understood that each of the entities involved in the present invention can be processor-controlled, and so the functions described herein can be carried out by a processor executing machine language instructions. While descriptions of such arrangements have been described for a wireless communication device and a BSC, the various functions described herein can be carried out by any combination of hardware, firmware, and/or software.

6. CONCLUSION

An exemplary embodiment of the present invention has been described above. Those skilled in the art will understand, however, that changes and modifications may be made to this embodiment without departing from the true scope and spirit of the invention, which is defined by the claims.

What is claimed is:

1. A method for managing multi-mode operation of a wireless communication device comprising:
   identifying one or more air interface protocols under which wireless service is available for the device;
   determining a type of communication in which the device is currently engaged; and
   based at least in part on the type of communication in which the device is currently engaged, selecting one of the air interface protocols available for the device as an air interface protocol under which the device should continue the communication in which the device is currently engaged;
   wherein selecting one of the air interface protocols as the air interface protocol under which the device should continue the communication in which the device is currently engaged comprises:
      retrieving a required level of network resources for the type of communication in which the device is engaged from a database;
      for each identified air interface protocol, retrieving a total level of network resources available under the air interface protocol from a database;
      for each identified air interface protocol, determining an existing level of air interface congestion;
      for each of the identified air interface protocols, calculating available network resources equal to the total network resources minus the existing level of air interface congestion; and selecting as the air interface protocol under which the device should operate continue the communication in which the device is currently engaged, one of the identified air interface protocols where the available network resources are greater than or equal to the required network for the type of communication in which the device is currently engaged.

2. The method of claim 1, wherein identifying air interface protocols under which wireless service is available for the device comprises:
determining a geographic location of the device; and
identifying air interface protocols under which wireless service is available for the device at the determined location.

3. The method of claim 2, wherein determining the geographic location of the device comprises querying a geographic location-determination platform, wherein the geographic-location determination platform determines the geographic location of the device at least in part by receiving one or more satellite-based positioning measurements from the device.

4. The method of claim 1, wherein identifying air interface protocols under which wireless service for the device is available at the determined location comprises identifying air interface protocols that are supported by the device.

5. The method of claim 2, wherein identifying air interface protocols under which wireless service for the device is available at the determined location comprises:
identifying air interface protocols provided for use by the device at the determined location;
identifying air interface protocols that are supported by the device; and
identifying air interface protocols that are both provided for use by the device at the determined location and supported by the device as the air interface protocols under which wireless service is available for the device.

6. The method of claim 5, wherein identifying air interface protocols under which service is provided at the determined location comprises querying a database that maps air interface protocols to geographic locations.

7. The method of claim 5, wherein identifying which of the air interface protocols the device supports comprises querying a device capabilities database.

8. The method of claim 1, wherein determining the type of communication in which the device is currently engaged comprises:
determining a network address with which the device is communicating; and
determining the type of communication based on the network address.

9. The method of claim 7, wherein determining the network address with which the device is communicating comprises:
determining an Internet Protocol (IP) address designated as a destination address in at least one data packet transmitted from the device or as a source address in at least one data packet transmitted to the device.

10. The method of claim 1, wherein determining the existing level of air interface congestion for each identified air interface protocol comprises:
determining a geographic location of the device; and
determining a sector throughput for a sector that encompasses the determined location.

11. The method of claim 1, further comprising:
after selecting the air interface protocol, directing the device to hand off to the selected air interface protocol if the device is not already operating under the selected air interface protocol.

12. The method of claim 11, wherein directing the device to hand off to the selected air interface protocol comprises sending to the device, over the air interface, a handoff directive message.

13. The method of claim 12, wherein the handoff directive message comprises a global service redirect message.

14. A system comprising:
at least one wireless communication device;
an antenna structure for engaging in radio frequency communication;
a processing unit;
data storage;
program logic stored executable by the processing unit (i) to identify one or more air interface protocols under which wireless service is available for the device, (ii) to determine a type of communication in which the device is currently engaged, and (iii) based at least in part on the type of communication in which the device is currently engaged, to select one of the identified air interface protocols as an air interface protocol under which the device should continue the communication in which the device is currently engaged;
wherein the program logic executable by the processing unit to select one of the identified air interface protocols as the air interface protocol under which the device should continue the communication comprises program logic executable by the processing unit to:
retrieve a required level of network resources for the type of communication in which the device is engaged from a database;
for each identified air interface protocol, retrieve a total level of network resources available under the air interface protocol from a database;
for each identified air interface protocol, determine an existing level of air interface congestion;
for each of the identified air interface protocols, calculate available network resources equal to the total network resources minus the existing level of air interface congestion; and
select as the air interface protocol under which the device should operate continue the communication in which the device is currently engaged, one of the identified air interface protocols where the available network resources are greater than or equal to the required network for the type of communication in which the device is currently engaged.

15. The system of claim 14, embodied in a radio access network.

16. The system of claim 14 wherein the program logic executable to identify the air interface protocols under which wireless service is available for the device comprises program logic executable to: (i) determine a geographic location of the device, and (ii) identify the air interface protocols under which wireless service is available for the device at the determined location.

17. The system of claim 16, further comprising:
first correlation data stored in the data storage, the first correlation data mapping air interface protocols with geographic locations, wherein the program logic is further executable to query the first correlation data so as to identify the interface protocols under which wireless service is available for the device at the determined location.

18. The system of claim 16, wherein the program logic that is executable to identify air interface protocols under which wireless service is available for the device comprises program logic executable to:

(i) identify one or more air interface protocols under which wireless service is provided at the determined location;
(ii) determine which of the air interface protocols the device supports; and
(iii) select a subset of the identified air interface protocols, wherein the subset comprises air interface protocols for which wireless service is provided at the determined location, and which are also supported by the device.

* * * * *